United States Patent
Peng (10) Patent No.: US 10,506,199 B2
(45) Date of Patent: Dec. 10, 2019

(54) FORMAT CONVERSION CIRCUIT APPLIED TO SET-TOP BOX AND ASSOCIATED METHOD

(71) Applicant: MStar Semiconductor, Inc., Hsinchu Hsien (TW)

(72) Inventor: Chun-Kang Peng, Hsinchu County (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/028,483

(22) Filed: Jul. 6, 2018

(65) Prior Publication Data
US 2019/0191124 A1  Jun. 20, 2019

(30) Foreign Application Priority Data
Dec. 15, 2017 (TW) ............... 106144045 A (51) Int. Cl.
| | |
|---|---|
| *H04N 7/01* | (2006.01) |
| *H04N 21/45* | (2011.01) |
| *H04N 21/4402* | (2011.01) |
| *G06T 5/00* | (2006.01) |
| *H04N 5/20* | (2006.01) |
| *H04N 9/67* | (2006.01) |

(52) U.S. Cl.
CPC ........... *H04N 7/0125* (2013.01); *G06T 5/007* (2013.01); *H04N 5/20* (2013.01); *H04N 9/67* (2013.01); *H04N 21/4402* (2013.01); *H04N 21/4508* (2013.01); *H04N 21/4516* (2013.01)

(58) Field of Classification Search
CPC ............ H04N 7/0125; H04N 21/4402; H04N 21/4508; G06T 5/007
USPC ...... 348/469, 441, 426.1, 555, 554, 557, 552
See application file for complete search history.

(56) References Cited

U.S. PATENT DOCUMENTS

| 2017/0251166 A1* | 8/2017 | Toma ................... H04N 21/431 |
| 2018/0048845 A1* | 2/2018 | Kozuka .................... H04N 5/20 |

FOREIGN PATENT DOCUMENTS

| CN | 107209929 | 9/2017 |
| TW | 201719577 | 6/2017 |

* cited by examiner

*Primary Examiner* — Jefferey F Harold
*Assistant Examiner* — Jean W Desir
(74) *Attorney, Agent, or Firm* — McClure, Qualey & Rodack, LLP (57) ABSTRACT

A format conversion circuit applied to a set-top box (STB), which is coupled to a display device, is disclosed. The format conversion circuit includes an electro-optical transfer function (EOTF) circuit, a mapping circuit and an opto-electronic transfer (OEFT) circuit. The EOTF circuit converts an input image signal having a first format to a first optical signal. The mapping circuit, coupled to the EOTF circuit, converts the first optical signal to a second optical signal having a second format, wherein at least one of the first optical signal and the second optical signal is generated according to a maximum luminance of the display device. The OETF circuit, coupled to the mapping circuit, converts the second optical signal to an output image signal.

13 Claims, 12 Drawing Sheets

FORMAT CONVERSION CIRCUIT APPLIED TO SET-TOP BOX AND ASSOCIATED METHOD

This application claims the benefit of Taiwan application Serial No. 106144045, filed Dec. 15, 2017, the subject matter of which is incorporated herein by reference.

BACKGROUND OF THE INVENTION

Field of the Invention

The invention relates to a set-top box (STB), and more particularly to a format conversion circuit applied to an STB.

Description of the Related Art

In the recent years, some image signal use a high dynamic range (HDR) format. Compared to a conventional standard dynamic range (SDR) (e.g., in a range of 0 to 1000 nits), an HDR (e.g., in a range of 0 to 10000 nit) can provide an image with higher contrast and clearer image. Because not all current televisions support the HDR format, a set-top box (STB) coordinating with a television may convert received image signals to image signal having a format supported by the television; that is, the STB can convert the image signals from an HDR to an SDR or convert the image signals from an SDR to an HDR. However, even if an STB can convert image signals to a format that can be played by a television, a maximum luminance value outputted by the STB may differ from a maximum luminance value that can be displayed by a display panel of the television, resulting degraded image display. Further, even if a television has a luminance adjustment function, display quality is nonetheless affected if the adjustment function is inadequate.

SUMMARY OF THE INVENTION

It is an object of the present invention to provide a format conversion circuit applied to a set-top box (STB). The format conversion circuit is capable of generating an output image signal according to a maximum luminance of a display device, such that a maximum luminance of the output image signal is equal to the maximum luminance of the display device. Thus, the display device at the back-end can directly display image data from the STB without adjusting luminance, thus solving issues of the prior art.

A format conversion circuit applied to an STB is disclosed according to an embodiment of the present invention. The STB is coupled to a display device. The format conversion circuit includes an electro-optical transfer function (EOTF) circuit, a mapping circuit and an opto-electrical transfer function (OETF) circuit. The EOTF circuit converts an input image signal having a first format to a first optical signal. The mapping circuit, coupled to the EOTF circuit, converts the first optical signal to a second optical signal having a second format, wherein at least one of the first optical signal and the second optical signal is generated according to a maximum luminance of the display device. The OETF circuit, coupled to the mapping circuit, converts the second optical signal to an output image signal.

A format conversion circuit applied to an STB is disclosed according to an embodiment of the present invention. The STB is coupled to a display device. The format conversion circuit includes an EOTF circuit, a color space conversion circuit, an OETF circuit and a mapping circuit. The EOTF circuit converts an input image signal having a first format to an optical signal. The color space conversion circuit performs color space conversion on the optical signal according to a target color space to generate a color converted optical signal. The OETF, coupled to the color space conversion circuit, converts the color converted optical signal to an electrical signal. The mapping circuit, coupled to the OETF circuit, converts the electrical signal to an output image signal having a second format. At least one of the optical signal and the output image signal is generated according to a maximum luminance of the display device.

A format conversion method applied to an STB is disclosed according to another embodiment of the present invention. The STB is coupled to a display device. The format conversion method includes: converting an input image signal having a first format to a first optical signal; converting the first optical signal to a second optical signal having a second format, wherein at least one of the first optical signal and the second optical signal is generated according to a maximum luminance of the display device; and converting the second optical signal to an output image signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
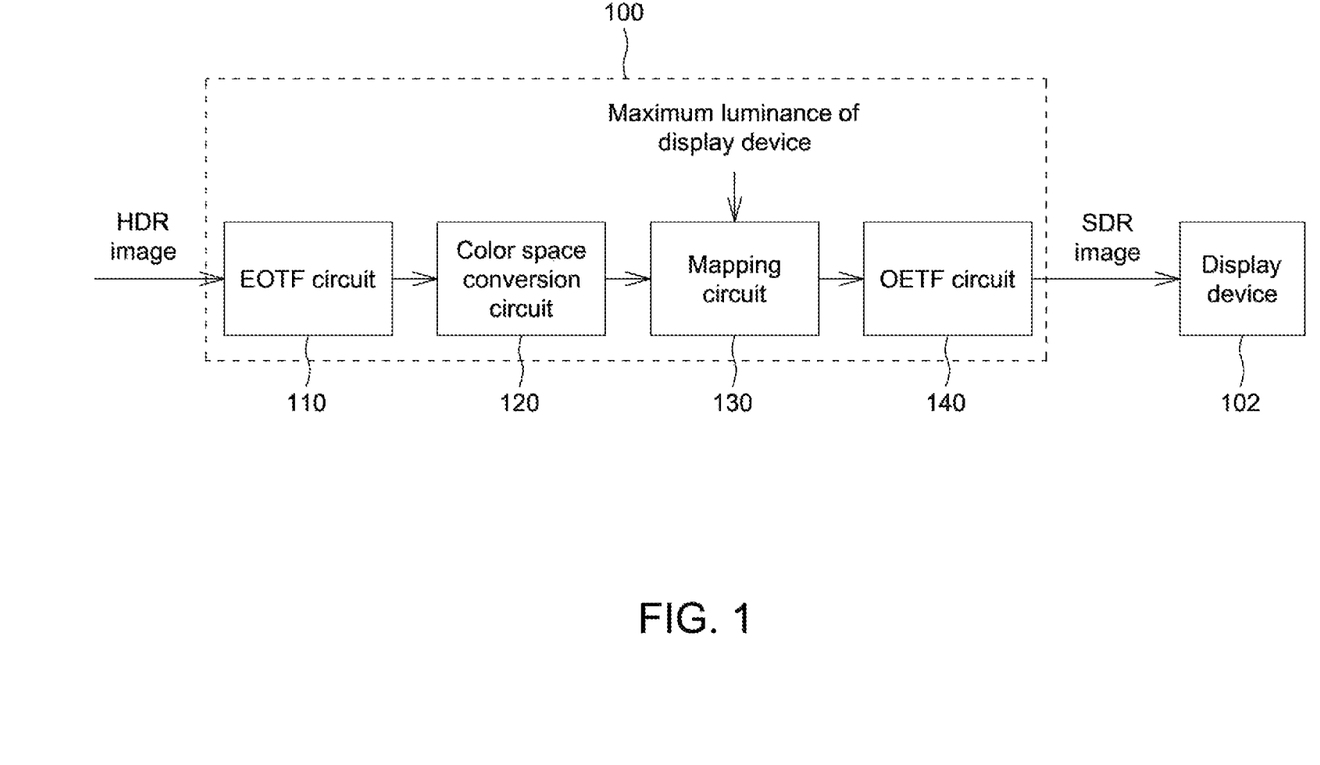
FIG. 1 is a block diagram of a format conversion circuit according to an embodiment of the present invention.

FIG. 1 shows a block diagram of a format conversion circuit 100 according to an embodiment of the present invention. As shown in FIG. 1, the format conversion circuit 100 includes an electro-optical transfer function (EOTF) circuit 110, a color space conversion circuit 120, a mapping circuit 130 and an opto-electrical transfer function (OETF) circuit 140. In this embodiment, the format conversion circuit 100 is provided in a set-top box (STB), and is for converting an input image signal having a high dynamic range (HDR) to an output image signal having a standard dynamic range (SDR), and transmitting the generated output image signal via an output circuit of the STB to a back-end display device 102 for display. Further, in this embodiment, the display device 102 is a television. However, in other embodiments, the format conversion circuit 100 may be provided in an image processing apparatus, and the display device 102 may be a mobile device receiving an output signal from the image processing apparatus.

Figure 2A:
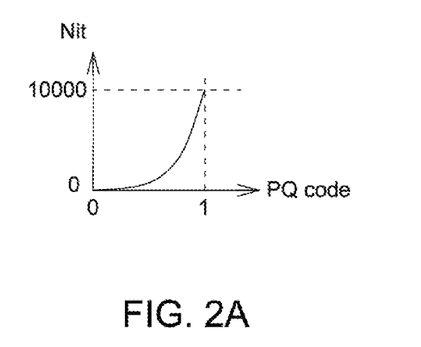
FIG. 2A is a conversion relationship diagram of PQ codes and nits according to an embodiment of the present invention.

In an operation of the format conversion circuit 100, the EOTF circuit 110 converts the input image signal having an HDR to a first optical signal having an HDR. More specifically, the input image signal is commonly referred to as a PQ signal, and a pixel value of each pixel may be represented by a PQ code. The EOTF circuit 110 may convert each PQ code in the input image signal to a corresponding nit by way of the relationship diagram between PQ codes and nits in FIG. 2A, and these nits serve as the first optical signal. Further, the range of the first optical signal is about 0 to 10000 nits because the input image signal has an HDR.

The color space conversion circuit 120 performs color space conversion on the first optical signal according to a gamut corresponding to a target color space to generate a color converted first optical signal. In another embodiment, it is possible that gamuts corresponding to color spaces of signals received do not need to be converted, and so the color space conversion circuit 120 may then be omitted.

Figure 2B:
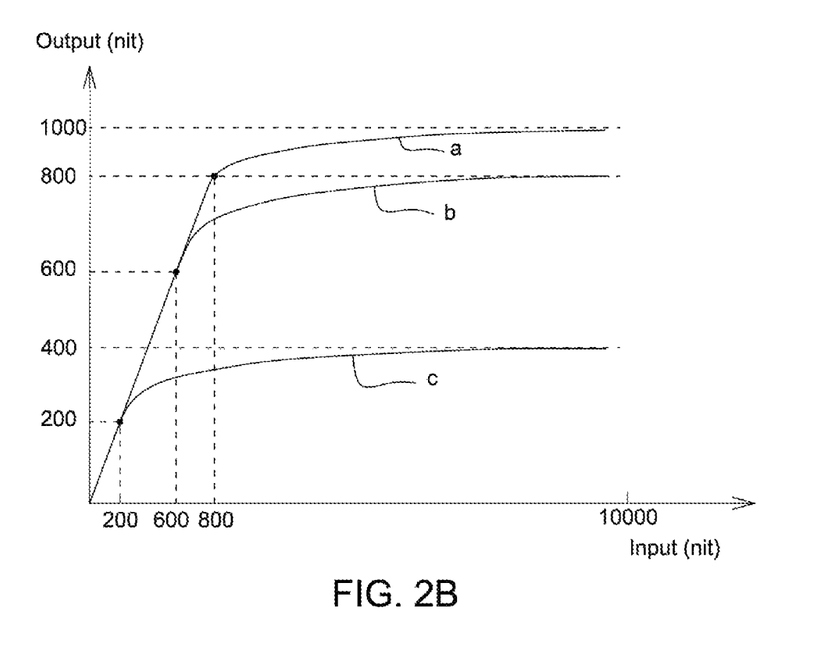
FIG. 2B is a schematic diagram of an operation of a mapping circuit according to an embodiment of the present invention.

The mapping circuit 130 converts the color converted first optical signal to a second optical signal having an SDR according to the maximum luminance of the display device 102. The maximum luminance of the display device 102 may be fed by the display device 102 through a connection line to the format conversion circuit 100 or be inputted by a user. For example, the display device 102 transmits extended display identification data (EDID) to the format conversion circuit 100 through an HDMI transmission line, wherein the EDID includes the maximum luminance of the display device 102. It should be noted that, the maximum luminance refers to a maximum luminance that can be displayed by a display panel of the display device 102. That is to say, when the luminance value expected to be displayed by a pixel is greater than this maximum luminance, the pixel value of the pixel displayed by the display device 102 is the maximum luminance. FIG. 2B shows a schematic diagram of an operation of the mapping circuit 130. The mapping circuit 130 may use the mapping function shown to convert the color converted first optical signal (having a maximum luminance value of about 10000 nits) to the second optical signal (having a maximum luminance value equal/approximate to the maximum luminance of the display device 102). As shown in FIG. 2B, assuming that the maximum luminance of the display device 102 is 1000 nits (corresponding to the mapping function a), the maximum luminance of the second optical signal is also equal to or approximate to 1000 nits. Similarly, assuming that the maximum luminance of the display device 102 is 800 nits (corresponding to the mapping function b) or 400 nits (corresponding to the mapping function c), the maximum luminance of the second optical signal is also equal to or approximate to 800 nits and 400 nits, respectively. Further, the transfer function has a linear section and a non-linear section, and the range of the linear section gets smaller as the maximum luminance of the display device 102 decreases. For example, when the maximum luminance of the display device 102 is 1000 nits, the range of the linear section of the transfer function may be 0 to 800 nits. Similarly, when the maximum luminance of the display device 102 is 800 nits or 400 nits, the range of the linear section of the transfer function may be 0 to 600 nits or 0 to 200 nits.

By determining the range of the linear section according to the maximum luminance of the display device 102, more details at dark areas can be preserved without sacrificing the luminance. As the maximum luminance of the display device 102 decreases, reducing the range of the linear section may prevent loss of details in bright areas due to excessive compression.

In one embodiment, when the color converted first optical signal is in the range of the linear section of the transfer function, the luminance value of the second optical signal is equal to the luminance value of the color converted first optical signal.

The OETF circuit 140 eventually converts the second optical signal to an output image signal, and outputs the output image signal to the back-end display device 102. More specifically, the OETF circuit 140 may convert each nit of the second optical signal to a corresponding PQ code according to the relationship diagram of PQ codes and nits in FIG. 2A, with these PQ codes serving as the output image signal. Further, the output image signal has an SDR format, and the maximum luminance of the output image signal is not greater than the maximum luminance of the display device 102.

As previously described, because the maximum luminance of the output image signal generated by the format conversion circuit 100 is the maximum luminance of the display device 102, the image signal does not require any compression or extension after the display device 102 receives the image signal from the STB, ensuring that the display quality is not degraded as a result of luminance adjustment at the display device end.

Figure 3:
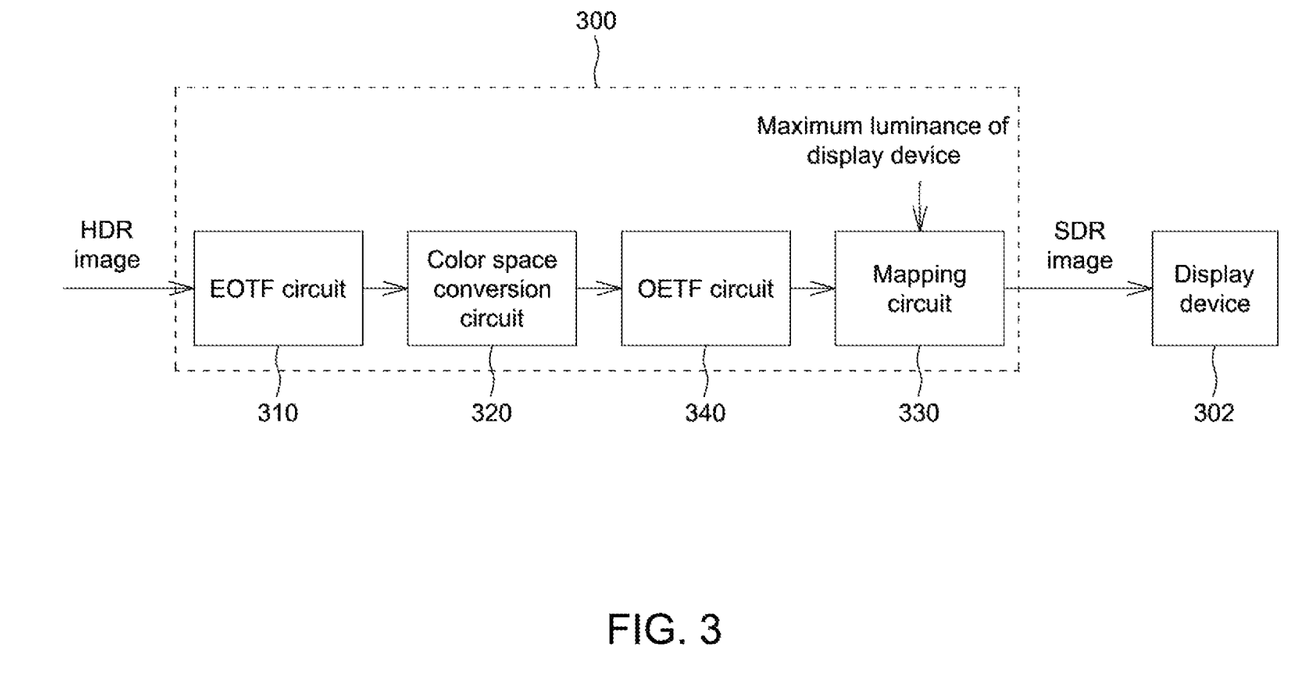
FIG. 3 is a block diagram of a format conversion circuit according to another embodiment of the present invention.

FIG. 3 shows a block diagram of a format conversion circuit 300 according to another embodiment of the present invention. Blocks in the format conversion circuit 300 are similar to those in the format conversion circuit 100, and such repeated details are omitted herein. However, the format conversion circuit 300 differs from the format conversion circuit 100 in that, after an OETF circuit 340 converts a color converted optical signal generated by a color space conversion circuit 320 to an electrical signal (PQ code), a mapping circuit 330 converts the electrical signal to an output image signal having an SDR. A person skilled in the art could easily conceive of the operations of the format conversion circuit 300 in FIG. 3 based on the description of the embodiments shown in FIGS. 1, 2A and 2B, and such repeated details are omitted herein.

Figure 4:
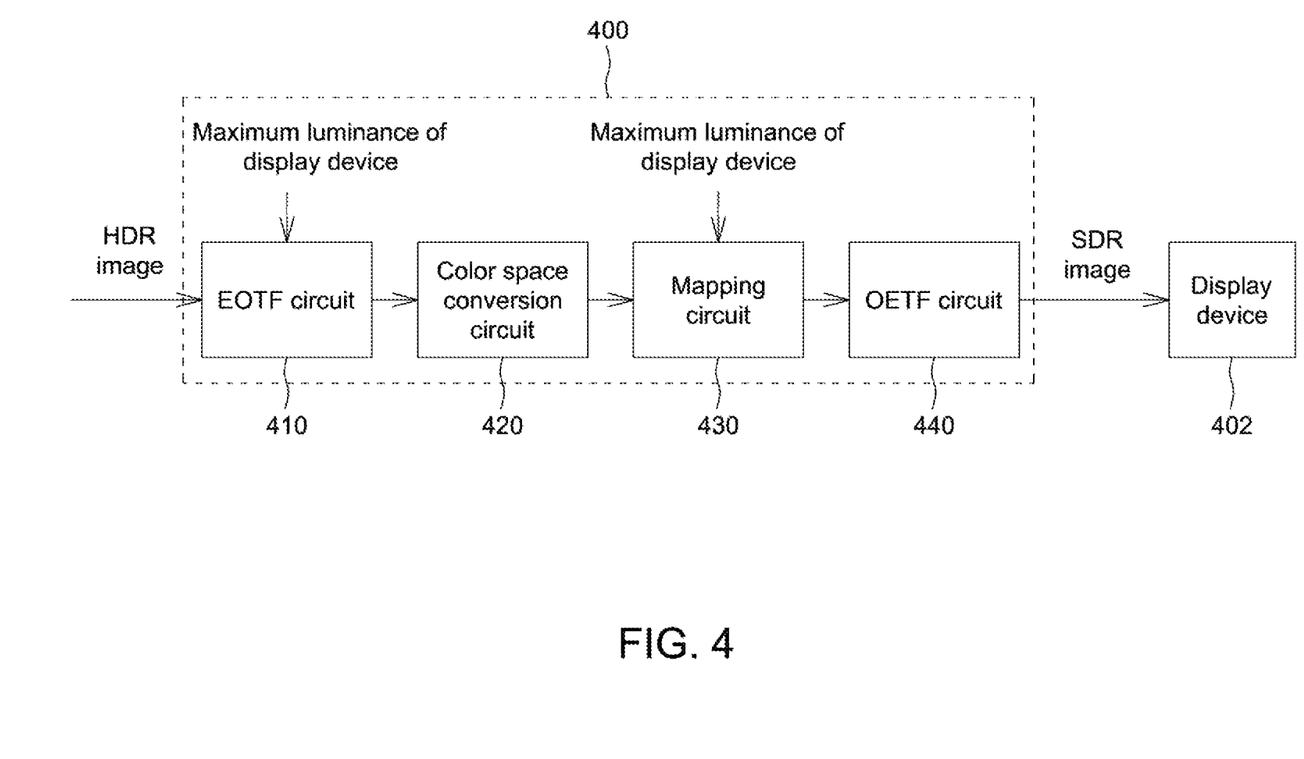
FIG. 4 is a block diagram of a format conversion circuit according to another embodiment of the present invention.
Figure 5:
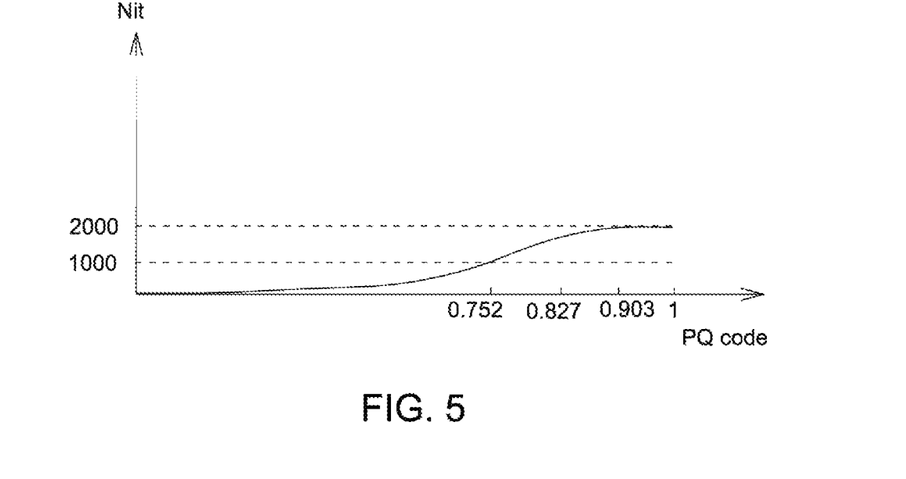
FIG. 5 a conversion relationship diagram of PQ codes and nits according to another embodiment of the present invention.

FIG. 4 shows a block diagram of a format conversion circuit 400 according to another embodiment of the present invention. The structure of the format conversion circuit 400 is similar to that of the format conversion circuit 100, and such repeated details are omitted herein. However, in an operation of the format conversion circuit 400, an EOTF circuit 410 further compresses the luminance of the input image signal according to the maximum luminance of a display device 402 when converting the input image signal to a first optical signal, such that the maximum luminance of the first optical signal is between the maximum luminance (e.g., 10000 nits) of the HDR standard and the maximum luminance of the display device 402. More specifically, referring to FIG. 5, assuming that the maximum luminance of the display device 402 is 1000 nits, the EOTF circuit 410 converts each PQ code of the input image signal to a corresponding nit according to the relationship diagram of PQ codes and nits in FIG. 5, wherein the maximum luminance of the first optical signal is about 2000 nits.

Figure 6:
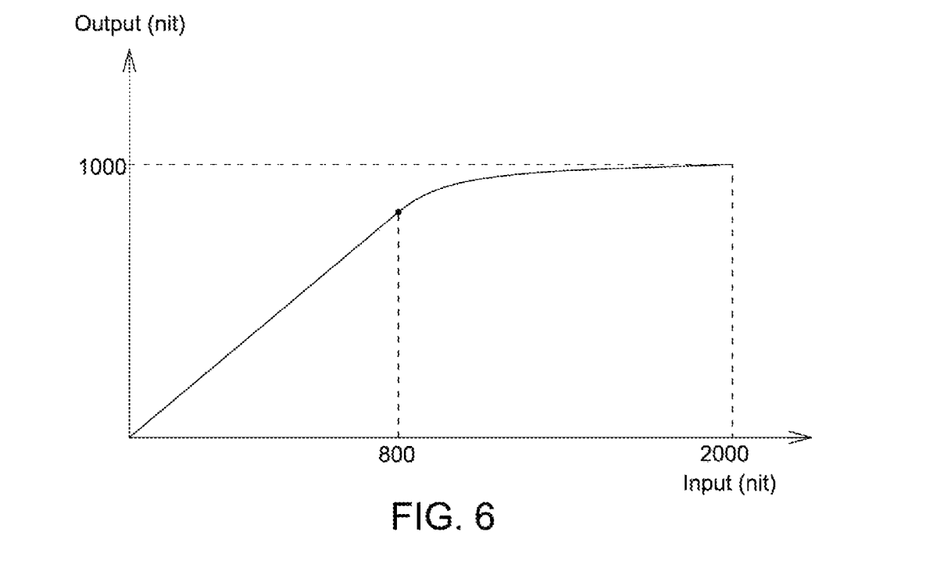
FIG. 6 is a schematic diagram of an operation of a mapping circuit according to another embodiment of the present invention.

FIG. 6 shows a schematic diagram of an operation of a mapping circuit 430. The mapping circuit 430 differs from the mapping circuit 130 in that, because the luminance range of the color converted first optical signal in the format conversion circuit 400 is reduced to 0 to 2000 nits, the mapping circuit 430 can use less hardware costs to convert the color converted first optical signal to the second optical signal by using the mapping function in FIG. 6 (where the maximum luminance is equal/approximate to the maximum luminance of the display device 402 (e.g., 1000 nits)). Thus, compared to the embodiments in FIGS. 1 and 3, this embodiment further lowers costs and enhances efficiency.

Figure 7:
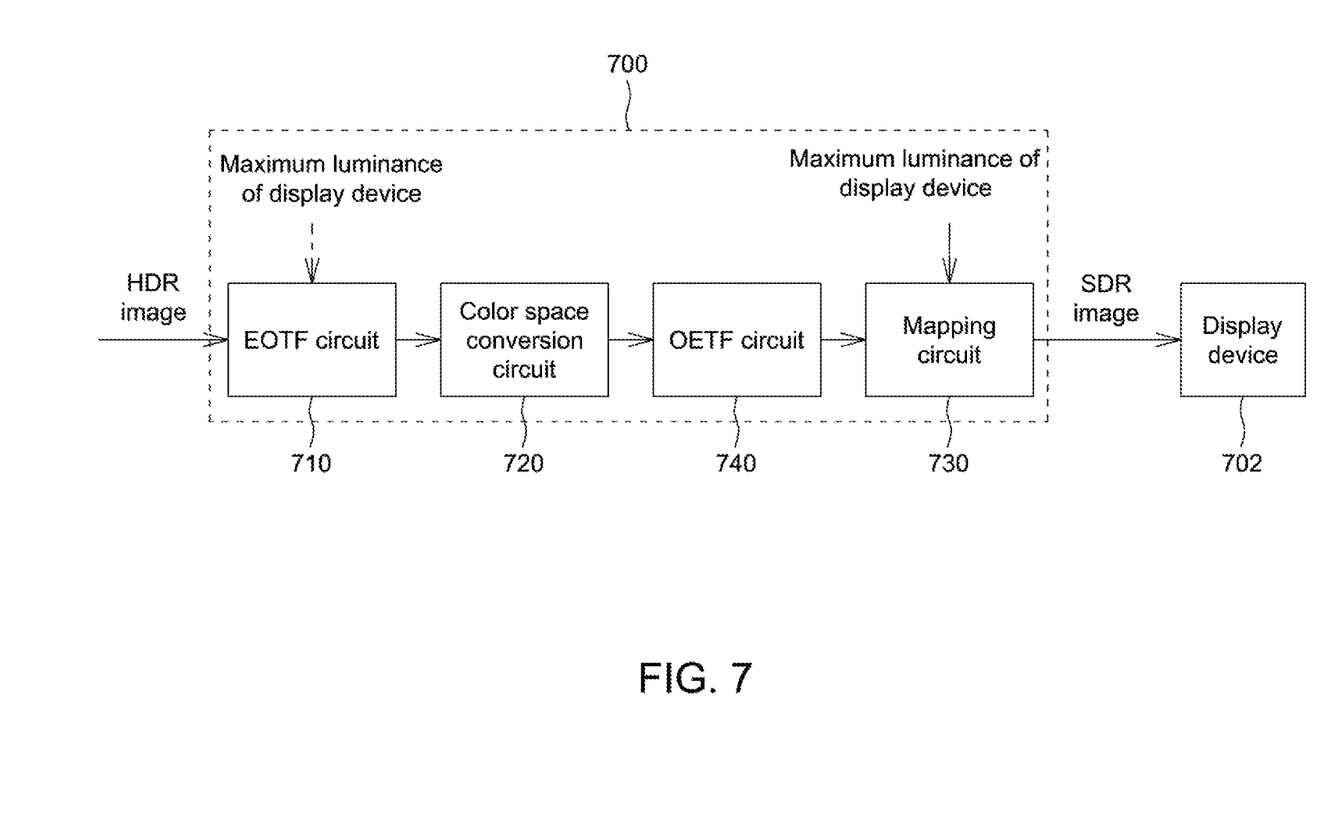
FIG. 7 is a block diagram of a format conversion circuit according to another embodiment of the present invention.

FIG. 7 shows a block diagram of a format conversion circuit 700 according to another embodiment of the present invention. Blocks in the format conversion circuits 700 are similar to those in the format conversion circuits 400, and such repeated details are omitted herein. However, the format conversion circuit 700 differs from the format conversion circuit 400 by the positions of an OETF circuit 740 and a mapping circuit 730. That is, in the format conversion circuit 700, the OETF circuit 740 first converts a color converted optical signal generated by a color space conversion circuit 720 to an electrical signal (PQ code), and the mapping circuit 730 then converts the electrical signal to an output image signal having an SDR. A person skilled in the art could conceive of the operations of the format conversion circuit 700 shown in FIG. 7, and such repeated details are omitted herein.

In the format conversion circuits 400 and 700, because the EOTF circuit 410 or 710 first compresses the luminance of the input image signal, the data amount of the first optical signal is significantly reduced, further lowering hardware costs of subsequent processing elements. For example, if the maximum luminance of the first optical signal is 10000 nits of the HDR standard, each set of data of the first optical signal needs 14 bits; if the maximum luminance of the first optical signal is compressed to 2000 nits as in the foregoing embodiment, each set of data of the first optical signal needs only 11 bits. Further, for the subsequent mapping circuit 130 or 430, compared to corresponding 0 to 10000 nits to 1000 nits, corresponding 0 to 2000 nits to 1000 nits also provides higher accuracy. Further, in another embodiment, the EOTF circuit 410 or 710 directly compresses the luminance of the input image signal to the maximum luminance of the display device 402 or 702, such that the mapping circuit 430 or 730 is not required to perform conversion or the mapping circuit 430 or 730 may be omitted.

Figure 8:
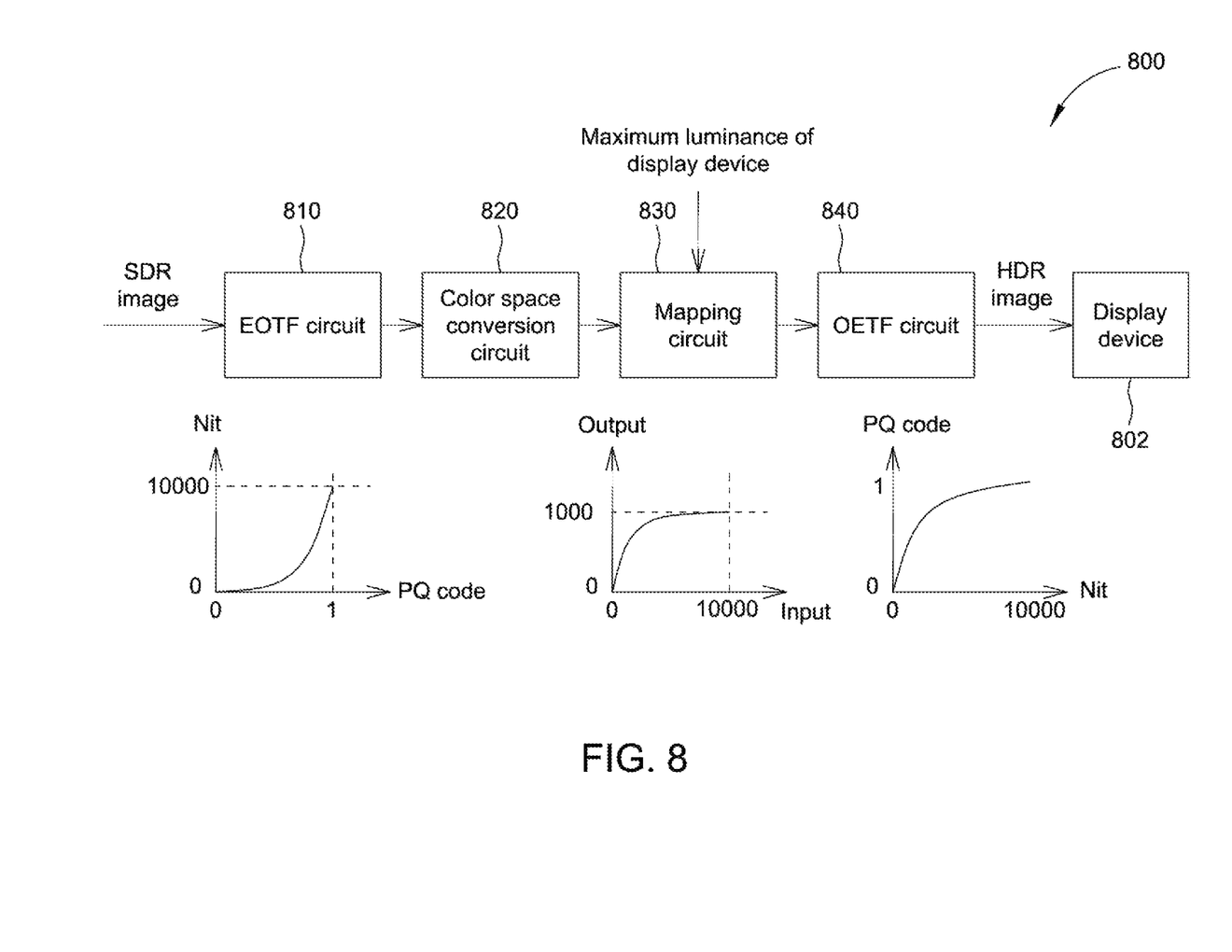
FIG. 8 is a block diagram and a schematic diagram of an operation of a format conversion circuit according to another embodiment of the present invention.

FIG. 8 shows a block diagram and a schematic diagram of an operation of a format conversion circuit 800 according to another embodiment of the present invention. Blocks in the format conversion circuit 800 are similar to those in the format conversion circuit 100, and such repeated details are omitted herein. However, the format conversion circuit 800 converts an input image signal having an SDR format to an output image signal having an HDR format, and differs from the format conversion circuit 100 in that, an EOTF circuit 810 convers each PQ code in the input image signal to a corresponding nit by using a relationship diagram of PQ codes and nits similar to FIG. 2A. Further, in this embodiment, when these nits are used as the first optical signal, the first optical signal has a range conforming to the HDR. For example, the range of the first optical signal in this embodiment is about 0 to 10000 nits.

Further, operation details of color space conversion circuit 820, a mapping circuit 830 and an OETF circuit 840 are similar to those of the color space conversion circuit 120, the mapping circuit 130 and the OETF circuit 140 in FIG. 1, and are omitted herein.

Figure 9:
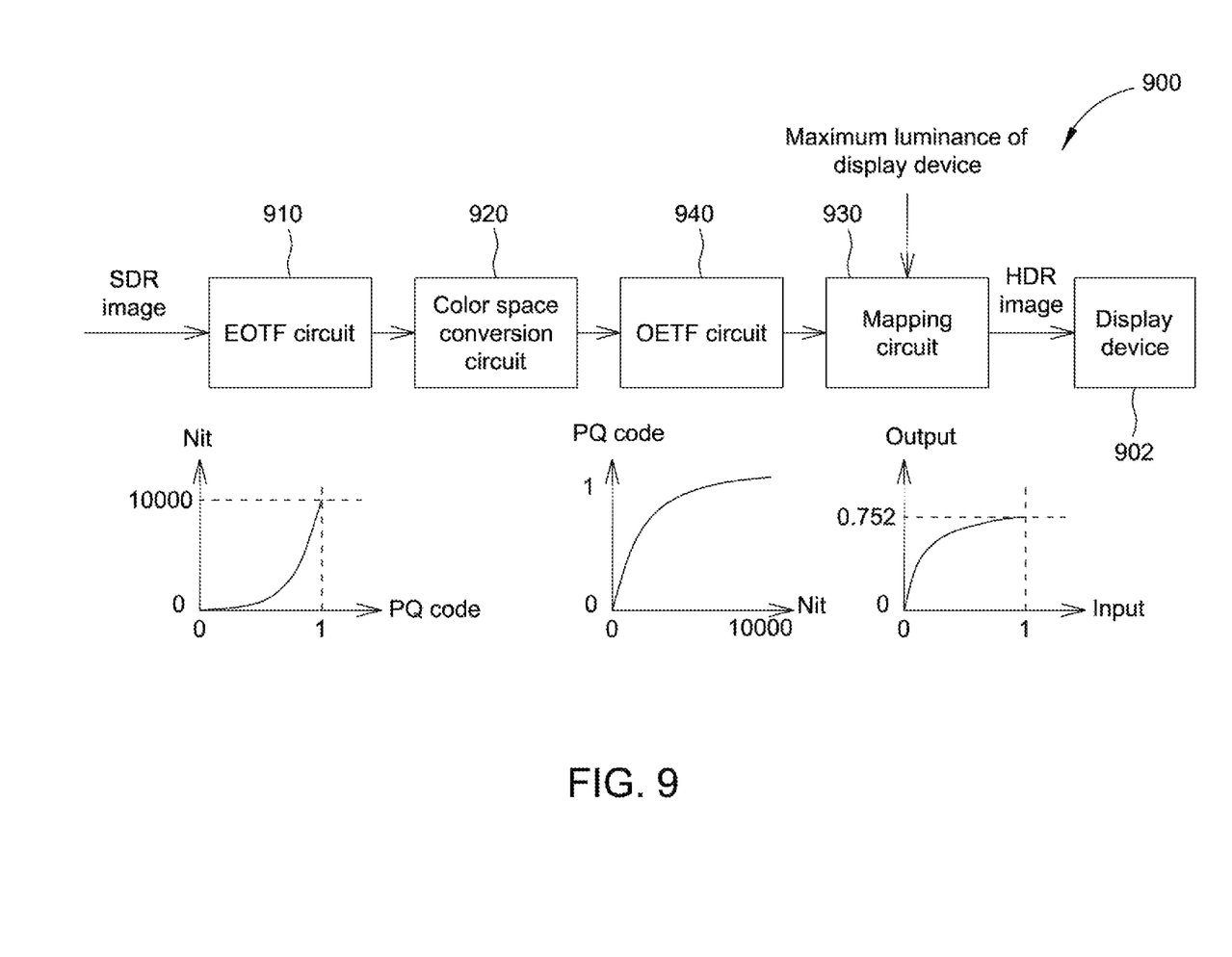
FIG. 9 is a block diagram and a schematic diagram of an operation of a format conversion circuit according to another embodiment of the present invention.

FIG. 9 shows a block diagram of a format conversion circuit 900 according to another embodiment of the present invention. Blocks in the format conversion circuit 900 are similar to those in the format conversion circuit 800 in FIG. 8, and such repeated details are omitted herein. The format conversion circuit 900 differs from the format conversion circuit 800 by the positions of an OETF circuit 940 and a mapping circuit 930. That is, in the format conversion circuit 900, the OETF circuit 940 first converts a color converted optical signal generated by a color space conversion circuit 920 to an electrical signal (PQ code), and the mapping circuit 930 then converts the electrical signal to an output image signal having an HDR. A person skilled in the art could easily conceive of operation details of the format conversion circuit 900 in FIG. 9 on the basis of the content of the embodiment in FIG. 8, and such repeated details are omitted herein.

Figure 10:
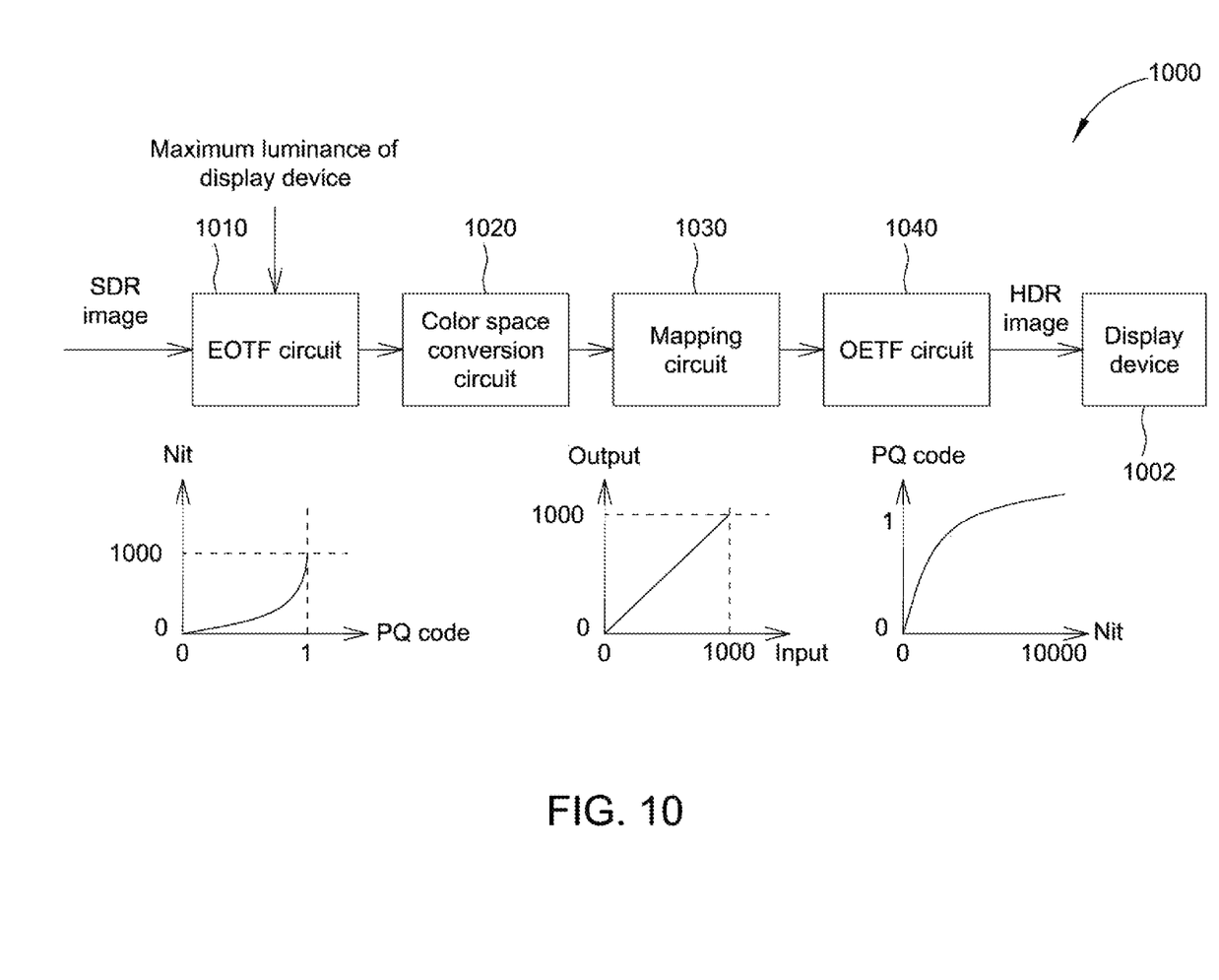
FIG. 10 is a block diagram and a schematic diagram of an operation of a format conversion circuit according to another embodiment of the present invention.

FIG. 10 shows a block diagram and a schematic diagram of an operation of a format conversion circuit 1000 according to another embodiment of the present invention. Blocks in the format conversion circuit 1000 are similar to those in the format conversion circuit 800, and such repeated details are omitted herein. However, in the operation of the format conversion circuit 1000, an EOTF circuit 1010 may further adjust the luminance of the input image signal according to the maximum luminance of a display device 1002 when converting the input image signal to a first optical signal, such that the maximum luminance of the first optical signal is equal to or approximate to the maximum luminance of the display device 1002.

Further, because the maximum luminance of the color converted optical signal is equal to or approximate to the maximum luminance of the display device 1002, a mapping circuit 1030 at this point may directly convert the color converted first optical signal to a second optical signal, and the luminance values of the color converted first optical signal and the second optical signal are substantially the same. Alternatively, in the format conversion circuit 1000, the mapping circuit 1030 may be directly omitted.

Operation details of a color space conversion circuit 1020 and an OETF circuit 1040 are similar to those of the color space conversion circuit 820 and the OETF circuit 840, and are omitted herein. However, the second optical signal having an SDR format is converted to an output image signal to the back-end display device 1002.

Figure 11:
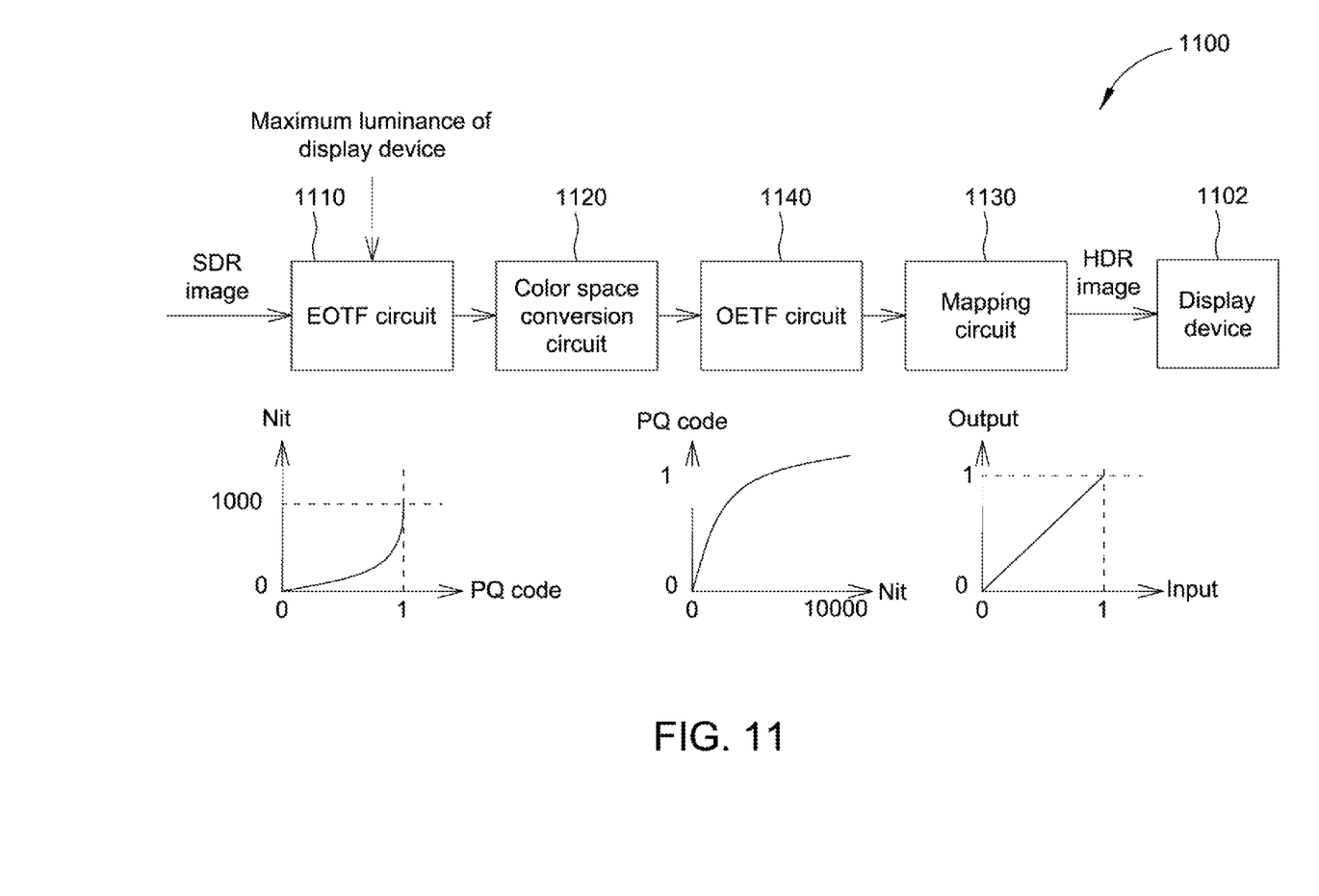
FIG. 11 is a block diagram and a schematic diagram of an operation of a format conversion circuit according to another embodiment of the present invention.

FIG. 11 shows a block diagram of a format conversion circuit 1100 according to another embodiment of the present invention. Blocks in the format conversion circuit 1100 are similar to those in the format conversion circuit 1000 in FIG. 10, and such repeated details are omitted herein. The format conversion circuit 1100 differs from the format conversion circuit 1000 by the positions of an OETF circuit 1140 and a mapping circuit 1130. That is, in the format conversion circuit 1100, the OETF circuit 1140 first converts a color converted optical signal generated by a color space conversion circuit 1120 to an electrical signal (PQ code), and the mapping circuit 1130 then converts the electrical signal to an output image signal having an HDR. A person skilled in the art could easily conceive of operation details of the format conversion circuit 1100 in FIG. 11 based on the content of the embodiment in FIG. 10, and such repeated details are omitted herein.

In the embodiments in FIGS. 8 and 9, the mapping circuit 830/930 converts the color converted first optical signal to a second optical signal having an HDR according to the maximum luminance of the display device 802/902. However, in the embodiments in FIGS. 10 and 11, the EOTF circuit 1010/1110 adjusts the luminance of the input image signal according to the maximum luminance of the display device 1002/1102, such that the maximum luminance of the first optical signal generated is equal to or approximate to the maximum luminance of the display device 1002/1102. On the other hand, in another embodiment of the present invention, the EOTF circuit and the mapping circuit may refer to the maximum luminance of the display device to adjust the luminance range of output signals thereof (similar to the embodiments in FIGS. 4 and 7). Given that the maximum luminance of the output image signal of the format conversion circuit is equal to the maximum luminance of the display device, any design modifications made are to be encompassed within the scope of the present invention.

Figure 12:
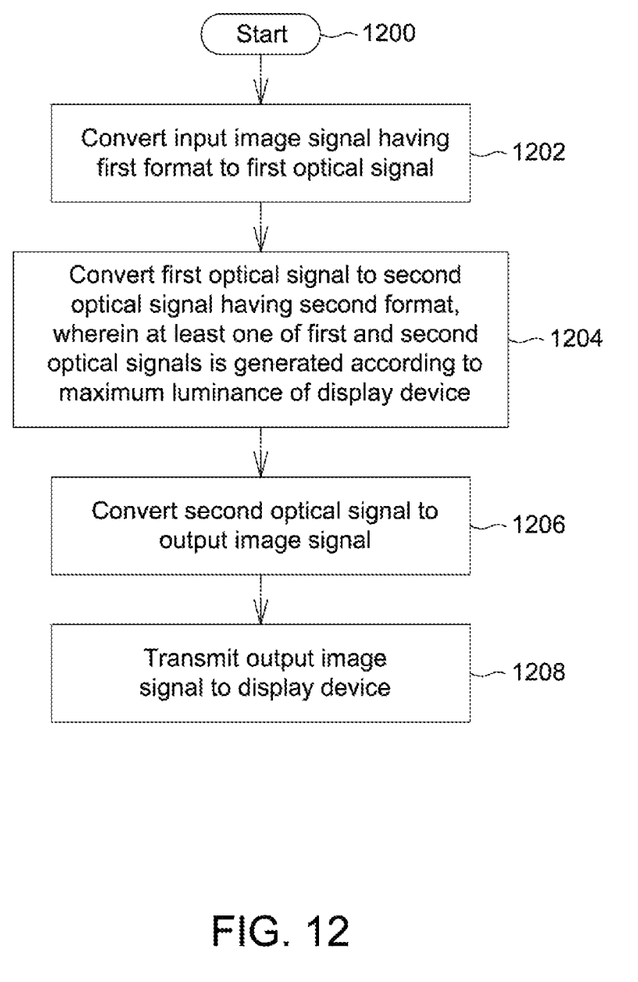
FIG. 12 is a flowchart of a format conversion method according to an embodiment of the present invention.

FIG. 12 shows a flowchart of a format conversion method according to an embodiment of the present invention. Referring to the embodiments in FIGS. 1, 4, 8 and 10, the process of the method includes the following.

In step 1200, the process begins.

In step 1202, an input image having a first format is converted to a first optical signal.

In step 1204, the first optical signal is converted to a second optical signal having a second format, wherein at least one of the first optical signal and the second optical signal is generated according to the maximum luminance of the display device.

In step 1206, the second optical signal is converted to an output image signal.

In step 1208, the output image signal is transmitted to the display device.

Figure 13:
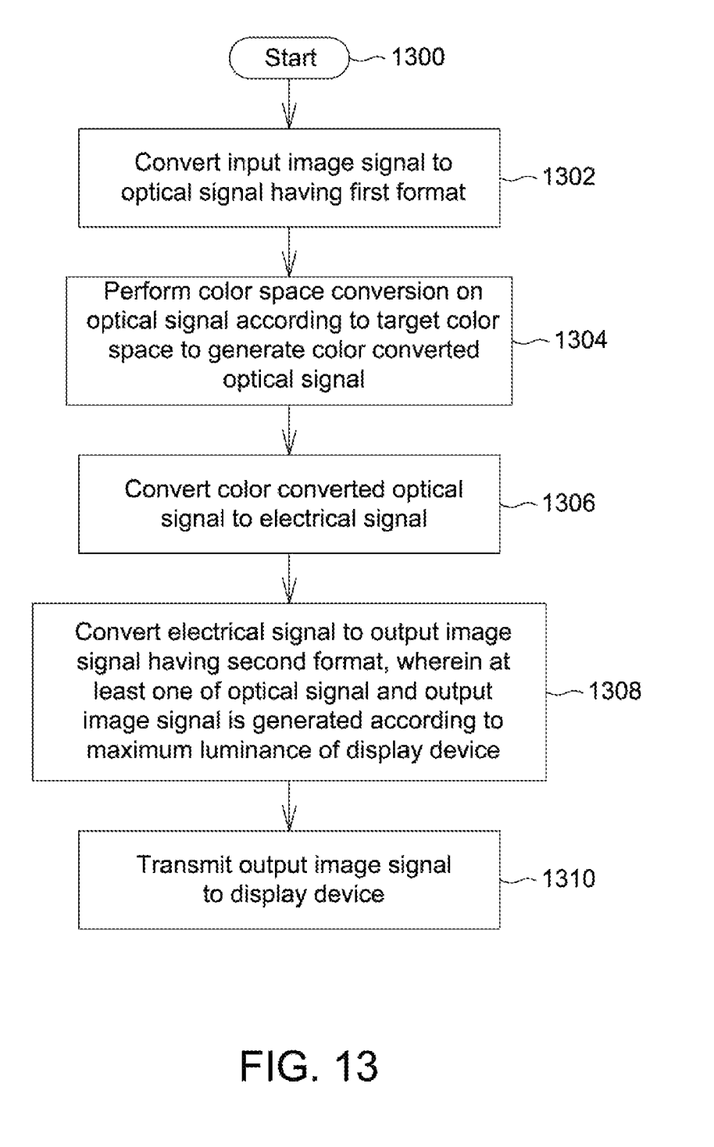
FIG. 13 is a flowchart of a format conversion method according to another embodiment of the present invention.

FIG. 13 shows a flowchart of a format conversion according to another embodiment of the present invention. Referring to the embodiments in FIGS. 3, 7, 9 and 11, the process of the method includes the following.

In step 1300, the process begins.

In step 1302: an input image signal having a first format is converted to an optical signal.

In step 1304, color space conversion is performed on the optical signal according to a target color space to generate a color converted optical signal.

In step 1306, the color converted optical signal is converted to an electrical signal.

In step 1308, the electrical signal is converted to an output image signal having a second format, wherein at least one of the optical signal and the output image signal is generated according to the maximum luminance of the display device.

In step 1301, the output image signal is transmitted to the display device.

In conclusion, in the format conversion circuit provided in an STB disclosed by the present invention, the maximum luminance of the output image signal is determined according to the maximum luminance of the back-end display device. Thus, after the display device receives the image signal from the STB, the luminance of the image signal need not be compressed or extended, thereby maintaining good display quality.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A format conversion circuit, applied to a set-top box (STB) coupled to a display device, comprising:
    an electro-optical transfer function (EOTF) circuit, converting an input image signal having a first format to a first optical signal, and compressing a luminance of the input image signal according to a maximum luminance of the display device, such that a maximum luminance of the first optical signal generated is lower than a maximum luminance of a high dynamic range (HDR) standard but is higher than the maximum luminance of the display device;
    a mapping circuit, coupled to the EOTF circuit, converting the first optical signal to a second optical signal having a second format, wherein the second optical signal is generated according to the maximum luminance of the display device; and
    an opto-electrical transfer function (OETF) circuit, coupled to the mapping circuit, converting the second optical signal to an output image signal.

2. The format conversion circuit according to claim 1, wherein a maximum luminance of the second optical signal is equal to the maximum luminance of the display device.

3. The format conversion circuit according to claim 1, wherein the first format is the high dynamic range, and the second format is a standard dynamic range (SDR).

4. The format conversion circuit according to claim 3, wherein the mapping circuit uses a mapping function to convert the first optical signal to the second optical signal having the second format, the mapping function comprises a linear section and a non-linear section, and a range of the linear section gets smaller as the maximum luminance of the display device decreases.

5. The format conversion circuit according to claim 4, wherein when the first optical signal is in the range of the linear section, a luminance value of the second optical signal is equal to a luminance value of the first optical signal.

6. The format conversion circuit according to claim 1, wherein the EOTF circuit converts the input image signal having the first format to the first optical signal according to the maximum luminance of the display device, such that a maximum luminance of the first optical signal is equal to the maximum luminance of the display device.

7. A format conversion circuit, applied to a set-top box (STB) coupled to a display device, comprising:
    an electro-optical transfer function (EOTF) circuit, converting an input image signal having a first format to an optical signal, and compressing a luminance of the input image signal according to a maximum luminance of the display device, such that a maximum luminance of the optical signal generated is lower than a maximum luminance of a high dynamic range (HDR) standard but higher than the maximum luminance of the display device;
    a color space conversion circuit, performing color space conversion on the optical signal according to a target color space to generate a color converted optical signal;
    an opto-electrical transfer function (OETF) circuit, coupled to the color space conversion circuit, converting the color converted optical signal to an electrical signal; and a mapping circuit, coupled to the OETF circuit, converting the electrical signal to an output image signal having a second format;
wherein, the output image signal is generated according to the maximum luminance of the display device.

8. The format conversion circuit according to claim 7, wherein a maximum luminance of the output image signal is equal to the maximum luminance of the display device.

9. The format conversion circuit according to claim 7, wherein the first format is the high dynamic range, and the second format is a standard dynamic range (SDR).

10. The format conversion circuit according to claim 9, wherein the mapping circuit uses a mapping function to convert the electrical signal to the output image signal having the second format, the mapping function comprises a linear section and a non-linear section, and a range of the linear section gets smaller as the maximum luminance of the display device decreases.

11. The format conversion circuit according to claim 10, wherein when the electrical signal is in the range of the linear section, a luminance value represented by the output image signal is equal to a luminance value represented by the electrical signal.

12. The format conversion circuit according to claim 7, wherein the EOTF circuit converts the input image signal having the first format to the optical signal according to the maximum luminance of the display device, such that a maximum luminance of the optical signal is equal to the maximum luminance of the display device.

13. A format conversion method, applied to a set-top box (STB) coupled to a display device, comprising:
converting an input image signal having a first format to a first optical signal and compressing a luminance of the input image signal according to a maximum luminance of the display device, such that a maximum luminance of the first optical signal generated is lower than a maximum luminance of a high dynamic range (HDR) standard but is higher than the maximum luminance of the display device;
converting the first optical signal to a second optical signal having a second format, wherein the second optical signal is generated according to the maximum luminance of the display device; and
converting the second optical signal to an output image signal.

* * * * *